United States Patent
Mok et al.

(10) Patent No.: US 9,786,267 B2
(45) Date of Patent: Oct. 10, 2017

(54) METHOD AND APPARATUS FOR RECORDING AND PLAYING USER VOICE IN MOBILE TERMINAL BY SYNCHRONIZING WITH TEXT

(71) Applicant: Samsung Electronics Co. Ltd., Suwon-si, Gyeonggi-do (KR)

(72) Inventors: Jieun Mok, Seongnam-si (KR); Byeonghoon Kwak, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 478 days.

(21) Appl. No.: 13/934,973

(22) Filed: Jul. 3, 2013

(65) Prior Publication Data
US 2014/0012583 A1   Jan. 9, 2014

(30) Foreign Application Priority Data
Jul. 6, 2012 (KR) ........................ 10-2012-0073581

(51) Int. Cl.
*G10L 13/04* (2013.01)
*G10L 13/06* (2013.01)
(Continued)

(52) U.S. Cl.
CPC .............. *G10L 13/00* (2013.01); *G11B 27/10* (2013.01)

(58) Field of Classification Search
CPC ....... G10L 13/00; G10L 13/033; G10L 13/08; G10L 15/04; G10L 13/04; G10L 13/043; G10L 13/06; G06F 3/0488; G06F 3/167
(Continued)

(56) References Cited

U.S. PATENT DOCUMENTS 5,893,132 A * 4/1999 Huffman ............. G06F 15/0283
                                                     704/260
5,915,237 A * 6/1999 Boss .................... G10H 1/0066
                                                     704/238
(Continued)

FOREIGN PATENT DOCUMENTS

CN          1946065 A       4/2007
CN        102184168 A       9/2011
(Continued)

OTHER PUBLICATIONS

Zhao, Chinese Patent Document 102184168, Translation from ProQuest Dialog, 7 Pages, May 18, 2017.*
(Continued)

*Primary Examiner* — Martin Lerner
(74) *Attorney, Agent, or Firm* — Jefferson IP Law, LLP (57) ABSTRACT

A method and an apparatus for recording and playing a user voice in a mobile terminal are provided. The method for recording and storing a user voice in a mobile terminal includes entering a page by executing an electronic book, identifying whether a user voice record file related to the page exists, generating a user voice record file related to the page by recording a text included in the page to a user voice if the user voice record file does not exist, and playing by synchronizing the user voice stored in the user voice record file with the text if the user voice record file exists. Accordingly, a user voice can be recorded corresponding to a text of a page when recording a specific record of an electronic book, and the text corresponding to the user voice being played can be highlighted by synchronizing the user voice and the text.

17 Claims, 9 Drawing Sheets

(51) Int. Cl.
  *G10L 13/00* (2006.01)
  *G11B 27/10* (2006.01)
(58) Field of Classification Search
  USPC ....... 704/231, 235, 258, 260, 261, 266, 267;
     715/716, 727; 3/231, 235, 258, 260, 261,
     3/266, 267
  See application file for complete search history.

(56) References Cited

U.S. PATENT DOCUMENTS

| | | | | |
|---|---|---|---|---|
| 5,970,454 | A * | 10/1999 | Breen | G10L 13/07 704/269 |
| 6,748,358 | B1 * | 6/2004 | Iwasaki | G10L 13/00 704/258 |
| 6,985,913 | B2 * | 1/2006 | Murata | G06F 17/30743 434/317 |
| 7,693,719 | B2 * | 4/2010 | Chu | G10L 13/033 704/258 |
| 8,073,695 | B1 * | 12/2011 | Hendricks | G10L 13/02 704/260 |
| 8,290,777 | B1 * | 10/2012 | Nguyen | G10L 13/00 704/270 |
| 8,315,872 | B2 * | 11/2012 | Beutnagel | G10L 13/07 704/258 |
| 8,751,235 | B2 * | 6/2014 | Mori | G10L 13/08 704/258 |
| 8,838,450 | B1 * | 9/2014 | Killalea | G10L 13/033 704/258 |
| 8,972,265 | B1 * | 3/2015 | Lester | G10L 13/00 704/246 |
| 2006/0069567 | A1 * | 3/2006 | Tischer | G10L 13/033 704/260 |
| 2007/0078656 | A1 | 4/2007 | Niemeyer et al. | |
| 2008/0195391 | A1 * | 8/2008 | Marple | G10L 13/10 704/260 |
| 2009/0006087 | A1 | 1/2009 | Imoto et al. | |
| 2009/0119108 | A1 * | 5/2009 | Noh | G10L 13/047 704/260 |
| 2009/0125309 | A1 * | 5/2009 | Tischer | G10L 13/033 704/260 |
| 2009/0202226 | A1 * | 8/2009 | McKay | G10L 13/00 704/260 |
| 2010/0131267 | A1 * | 5/2010 | Silbert | G10L 13/06 704/10 |
| 2010/0318362 | A1 | 12/2010 | Kurzweil et al. | |
| 2010/0318363 | A1 | 12/2010 | Kurzweil et al. | |
| 2011/0153330 | A1 * | 6/2011 | Yazdani | G10L 13/00 704/260 |
| 2011/0184738 | A1 * | 7/2011 | Kalisky | G06F 3/167 704/260 |
| 2011/0320206 | A1 * | 12/2011 | Chen | G09B 5/062 704/260 |
| 2012/0265533 | A1 * | 10/2012 | Honeycutt | G10L 13/00 704/260 |
| 2013/0305174 | A1 * | 11/2013 | Kim | G06F 3/0488 715/765 |
| 2014/0006998 | A1 * | 1/2014 | Mok | G06F 9/4443 715/776 |

FOREIGN PATENT DOCUMENTS

| | | |
|---|---|---|
| CN | 102446176 A | 5/2012 |
| WO | 99/66493 A1 | 12/1999 |

OTHER PUBLICATIONS

Shi, Chinese Patent Document 102446176, Translation from ProQuest Dialog, 5 Pages, May 18, 2017.*

* cited by examiner

SCHOOL → MP3_SCHOOL
COMPANY → MP3_COMPANY
       ⋮

METHOD AND APPARATUS FOR RECORDING AND PLAYING USER VOICE IN MOBILE TERMINAL BY SYNCHRONIZING WITH TEXT

PRIORITY

This application claims the benefit under 35 U.S.C. §119(a) of a Korean patent application filed on Jul. 6, 2012 in the Korean Intellectual Property Office and assigned Serial No. 10-2012-0073581, the entire disclosure of which is hereby incorporated by reference.

BACKGROUND OF THE INVENTION

1. Field of the Invention

The present invention relates to a method and an apparatus for recording and playing a voice in a mobile terminal. More particularly, the present invention relates to a method and an apparatus for recording a voice corresponding to a text of a page when recording a specific page of an electronic book and highlighting the text corresponding to the voice being played by synchronizing the voice with the text.

2. Description of the Related Art

With advances in communication technology, mobile terminals are being developed as multimedia equipment that provide various optional services such as an electronic organizer, games, schedule management, and the like. With the various optional services now provided, a user interface is essential to conveniently use and manage the various optional services.

Figure 1:
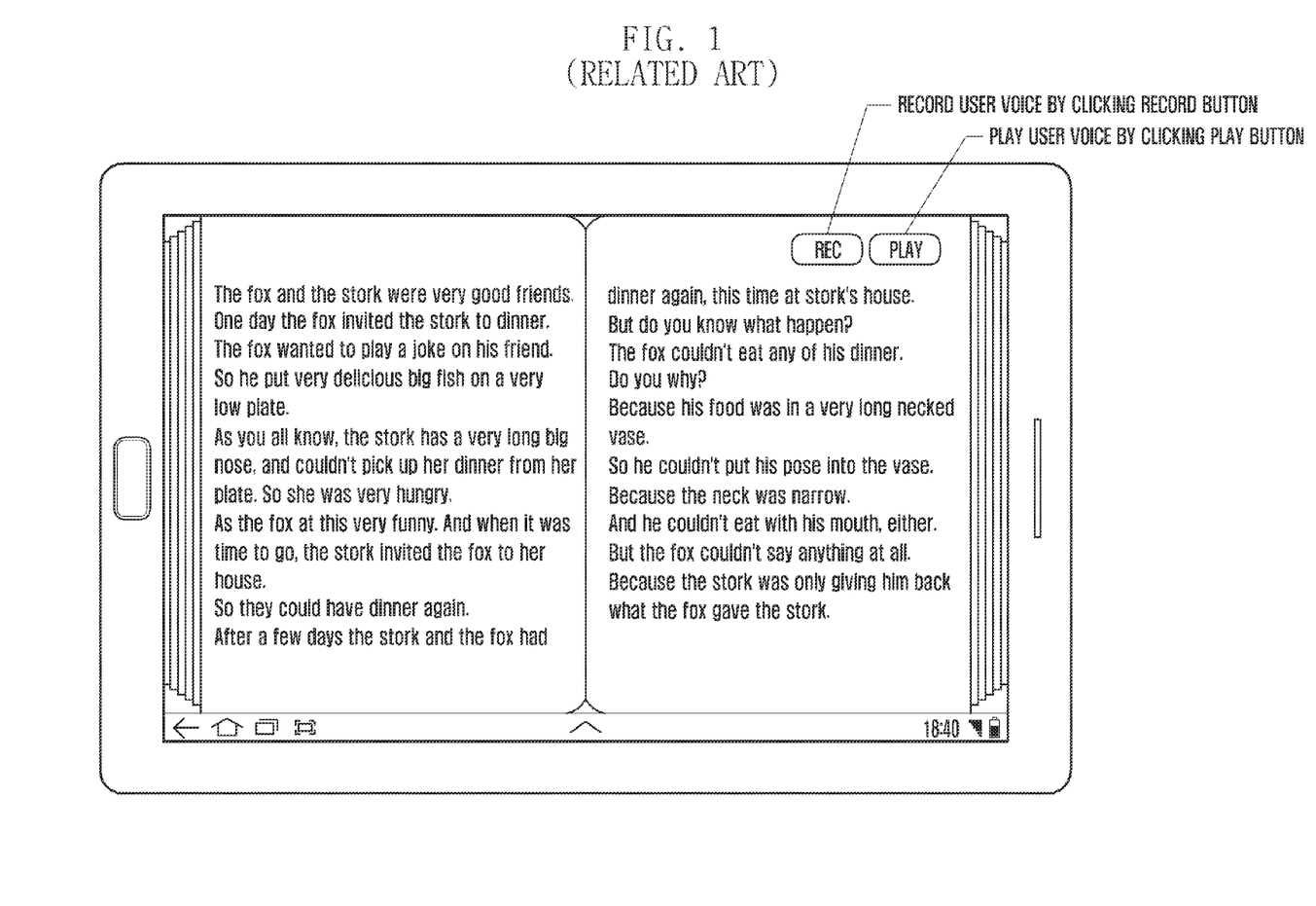
FIG. 1 illustrates the recording of a text included in a specific page of an electronic book with a voice and playing the recorded voice according to the related art.

FIG. 1 illustrates the recording of a text included in a specific page of an electronic book with a voice and playing the recorded voice according to the related art.

As shown in FIG. 1, an electronic book (e-book) provides a function of recording contents (i.e., a text) configured in a specific page of the electronic book as a voice and playing it. For this, a user inputs their voice by selecting a record command in a specific page of the electronic book, and plays their voice recorded in the corresponding page by selecting a play command.

However, in the technology of the related art, the entire electronic book must be saved to record the user's voice, and thereby requires a lot of time and labor if the size of the electronic book is large.

Further, the technology of the related art has difficulty in intuitively identifying which word is currently being played because the recorded voice is not synchronized with a text of the electronic book.

Accordingly, there is a need for an improved apparatus and method for recording a voice corresponding to text of a page when recording a specific page of an electronic book and highlighting the text corresponding to the voice being played by synchronizing the voice and the text.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problem and/or disadvantages and to provide at least the advantages described below. Accordingly, an aspect of the present invention is to provide a method and an apparatus for recording a user voice corresponding to a text of a page when recording a specific page of an electronic book and highlighting the text corresponding to the user voice being played by synchronizing the user voice and the text.

In accordance with an aspect of the present invention, a method for recording and playing a user voice is provided. The method includes entering a page by executing an electronic book, identifying whether a user voice record file related to the page exists, generating a user voice record file related to the page by recording a text included in the page to a user voice if the user voice record file does not exist, and playing by synchronizing the user voice stored in the user voice record file with the text if the user voice record file exists.

In accordance with another aspect of the present invention, an apparatus for recording and playing a user voice is provided. The apparatus includes an input unit for receiving a user input, a display unit for displaying a text included in an electronic book, and a control unit for controlling to identify whether a user voice record file related to the page exists when entering a page of the electronic book, to generate a user voice record file by recording a text included in the page to a user voice if the user voice record file does not exist, and to play by synchronizing the user voice stored in the user voice record file with the text if the user voice record file exists.

According to exemplary embodiments of the present invention, a voice can be recorded corresponding to a text of a specific page when recording the specific page of an electronic book, and the text can be highlighted corresponding to the voice being played by synchronizing the voice with the text while playing the voice. Accordingly, a user can experience reading a real book through an intuitive interface.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 2:
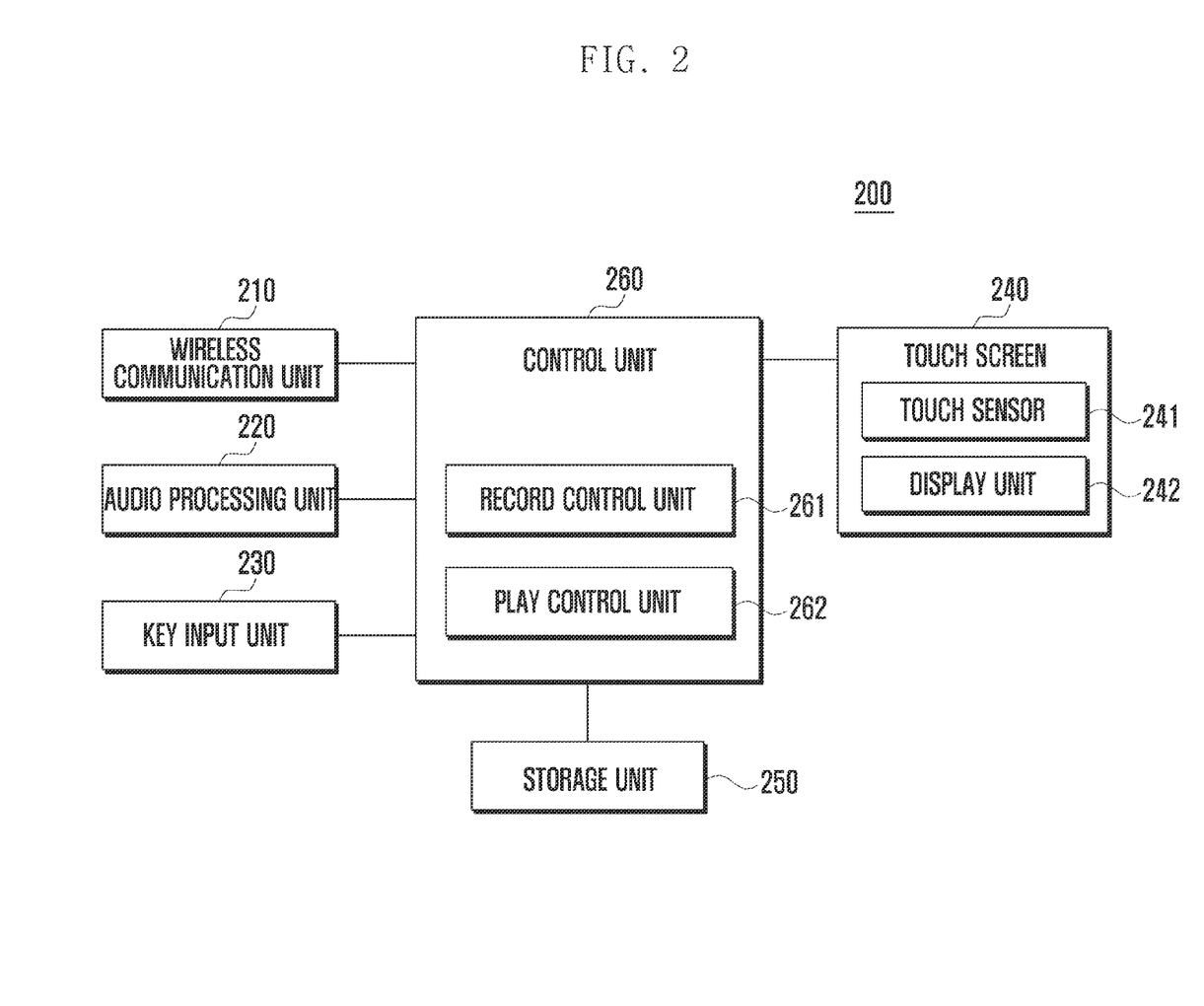
FIG. 2 is a block diagram showing an internal structure of a mobile terminal according to an exemplary embodiment of the present invention.

FIG. 2 is a block diagram showing an internal structure of a mobile terminal according to an exemplary embodiment of the present invention.

Referring to FIG. 2, the mobile terminal 200 may include a wireless communication unit 210, an audio processing unit 220, a key input unit 230, a touch screen 240, a storage unit 250, and a control unit 260.

The wireless communication unit 210 performs data transmission and reception to support a wireless communication function of the mobile terminal 200. The wireless communication unit 210 includes an RF transmitter for up-converting and amplifying the frequency of a signal to be transmitted and an RF receiver for low-noise amplifying and down-converting the frequency of a received signal. Further, the wireless communication unit 210 outputs data that is received through a wireless communication channel to the control unit 260 and transmits data that is output by the control unit 260 through the wireless communication channel.

The audio processing unit 220 is configured with a data codec for processing packet data and an audio codec for processing an audio signal such as a voice. The audio processing unit 220 converts a digital audio signal to an analog audio signal through the audio codec and outputs the analog audio signal through a speaker. An analog audio signal input from a microphone is converted to a digital audio signal through the audio codec.

The key input unit 230 receives a user's key input for the control of the mobile terminal 200 and generates an input signal to transmit to the control unit 260. The key input unit 230 may be configured with a keypad including numeric keys and direction keys, and function keys may be formed at a surface of the mobile terminal 200. In a mobile terminal having a touch screen 240 according to an exemplary embodiment of the present invention, the operation of the key input unit 230 may be performed using the touch screen 240, and thereby the key input unit 230 may be omitted.

The touch screen 240 includes a touch sensor 241 and a display unit 242. The touch sensor 241 detects a user's touch input. The touch sensor 241 may be configured with a touch sensor such as a capacitive overlay sensor, a pressure sensitive sensor, a resistive overlay sensor, and an infrared beam detecting sensor. Besides the above sensors, any type of sensor detecting contact or pressure of an object can be used as the touch sensor 241 according to the present invention. The touch sensor 241 detects a user's touch input and generates a detection signal to transmit to the control unit 260. The detection signal includes coordinate data of a location touched by the user. If the user moves a touch location, the touch sensor 241 generates a detection signal including coordinate data of a path of the touch movement to transmit to the control unit 260.

More particularly, the touch sensor 241 detects a user input for recording or playing contents of an electronic book according to an exemplary embodiment of the present invention. Such a user input may be, for example, a touch (including a multi-touch) or a drag.

The display unit 242 may be formed with a Liquid Crystal Display (LCD), Organic Light Emitting Diodes (OLEDs), or Active Matrix Organic Light Emitting Diodes (AMOLEDs), and provide the user with a variety of visual information such as a menu, input data, function setting information of the mobile terminal 200, and the like. The display unit 242 performs a function of outputting a booting screen, a waiting screen, a menu screen, a telecommunication screen, and other application screens of the mobile terminal 200.

The mobile terminal 200 may be configured with a touch screen as described above. However the mobile terminal 200 is not limited to the touch screen. In exemplary implementations, if a mobile terminal not having a touch screen is applied, the touch screen 240 shown in FIG. 2 may be modified to perform only the function of the display unit 242.

The storage unit 250 may be divided into a program area and a data area, and performs a role of storing programs and data required for the operation of the mobile terminal 200. The program area stores a program for controlling general operations of the mobile terminal 200, an Operating System (OS) for booting the mobile terminal 200, an application program required for playing multimedia contents, and application programs required for optional functions of the mobile terminal 200, such as a camera function, a sound play function, a play function of a still or moving image, and the like. The data area stores data generated according to the use of the mobile terminal 200, such as a still image, a moving image, a phone book, audio data, and the like.

According to the exemplary embodiment of the present invention, the storage unit 250 stores user voice files recorded in each page of an electronic book and synchronization files synchronized with the user voice files in each page. Further, the storage unit 250 stores the user voice files recorded by phoneme in a database to perform an auto complete function of Text To Speech (TTS) recording for contents of the electronic book.

The control unit 260 controls general operations of components of the mobile terminal 200. More particularly, the control unit 260 records a user voice corresponding to a text of a specific page of the electronic book when the mobile terminal 200 records the specific page, and controls a process of highlighting a text corresponding to the user voice by synchronizing the text with the user voice while the mobile terminal 200 plays the user voice. For this, the control unit 260 includes a record control unit 261 and a play control unit 262.

The record control unit 261 controls a general procedure of TTS recording of a text included in a specific page of the electronic book to a user voice. For this, the record control unit 261 identifies whether a user voice record file related to the page exists when entering a page of the electronic book. If a user voice record file does not exist, the record control unit 261 records a text included in the page to a user voice, and generates a user voice record file related to the page.

Here, the record control unit 261 generates a user voice record file converted from the text included in the page and a synchronization file including text location information corresponding to each time section of the user voice record file. The synchronization file includes information for highlighting a text of a user voice being played by synchronizing with the user voice record file. A more detailed explanation will be provided later.

According to an exemplary embodiment of the present invention, the record control unit 261 identifies whether a touch input is detected at a text location if a TTS record command for a text is received. The record control unit 261 controls to start recording a user voice if the touch input is not detected until a preset time elapses. If a touch input is detected at a location of the text, the record control unit 261 sets the text location at which the touch input is detected as an initial location starting to record a user voice.

Further, the record control unit 261 classifies input user voices by phoneme, and controls to generate and save phonemic voice files. The phonemic voice file is used for performing an auto complete function of TTS recording according to an exemplary embodiment of the present invention.

For this, the record control unit 261 compares the phonemic voice file with all the text files included in the electronic book when recording a user voice for a page is completed. The record control unit 261 then identifies whether auto complete of recording is possible for the texts included in the remaining pages without storing a user voice record file by using the phonemic voice file. If the auto complete of recording is possible, the record control unit 261 controls to inform the user that the automatic recording complete is possible. While executing an automatic record command, the record control unit 261 controls to convert the texts included in the remaining pages without storing a user voice record file to user voices by using the phonemic voice file.

The play control unit 262 controls to play a user voice stored in the user voice record file by synchronizing the text with the user voice if the user voice record file exists in a page of the electronic book. According to an exemplary embodiment of the present invention, the play control unit 262 controls to highlight a text corresponding to a user voice stored in the user voice record file.

In more detail, the play control unit 262 identifies whether a synchronization file corresponding to the user voice record file exists if a play command is received. If a synchronization file exists, the play control unit 262 identifies text location information included in the synchronization file corresponding to each time section of a user voice record file. According to the result of the identification, the play control unit 262 controls to play by synchronizing a user voice stored in the user voice record file with the text.

If a synchronization file does not exist, the play control unit 262 controls to convert a user voice recorded in the user voice record file corresponding to the page to a text, and controls to play by synchronizing the converted text with a text included in the page.

In the above description, the control unit 260, the record control unit 261, and the play control unit 262 are illustrated as separate blocks, and perform individually different functions. However, this is for convenience in explanation, and it is to be understood that, in an alternative implementation, the functions may not divided. For example, a specific function performed by the record control unit 261 may be performed by the control unit 260.

Figure 3:
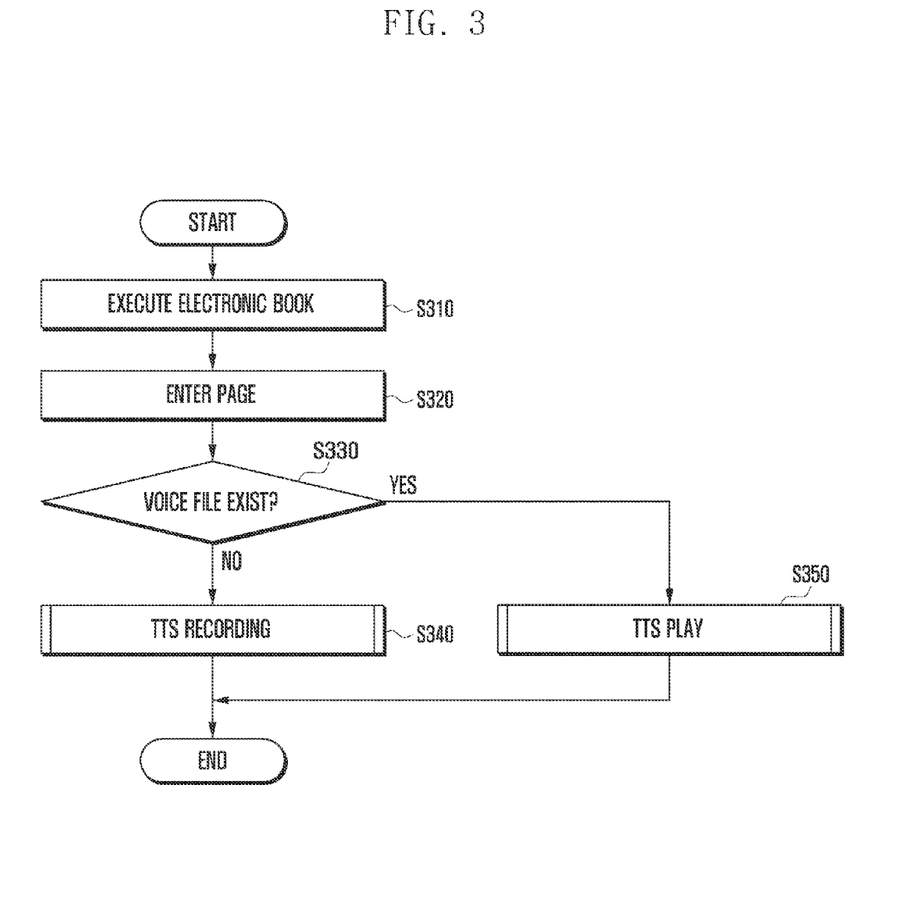
FIG. 3 is a flowchart showing a procedure of recording or playing contents included in a specific page of an electronic book according to an exemplary embodiment of the present invention.

FIG. 3 is a flowchart showing a procedure of recording or playing contents included in a specific page of an electronic book according to an exemplary embodiment of the present invention.

Referring to FIG. 3, the control unit 260 detects execution of an electronic book application in step S310. The electronic book may be called an e-book which is a general name of digital book containing information such as characters and images recorded in electronic media. A smart phone or a Portable Multimedia Player (PMP) may download an electronic book application for executing and using the electronic book from a server, or the electronic book application may be integrated in the smart phone or PMP in a production process.

The control unit 260 detects whether the electronic book application is located at a specific contents, for example, a page of electronic book contents including a text in step S320. In step S330, the control unit 260 identifies whether a user voice record file corresponding to the specific page exists. Hereafter, the term user voice record TTS file may be used as the user voice record file.

If a user voice record file corresponding to the specific page does not exist, the control unit 260 performs a process of TTS recording of a user voice, in which a text included in the page is converted to a user voice, according to a user's selection in step S340. In the TTS recording of a user voice, the control unit 260 may configure and save a user voice record file corresponding to the text and a synchronization file (for example, caption) corresponding to the user voice of the user voice file.

A more detailed process of TTS recording of a user voice will be described below by referring to FIG. 4.

If a user voice record file corresponding to the specific page exists, the control unit 260 performs TTS play of the user voice record file corresponding to the page in step S350. In the TTS play, the control unit 260 may highlight a text corresponding to the user voice being played by synchronizing the user voice with the text of the page.

A more detailed process of TTS play will be described below by referring to FIG. 7.

Figure 4:
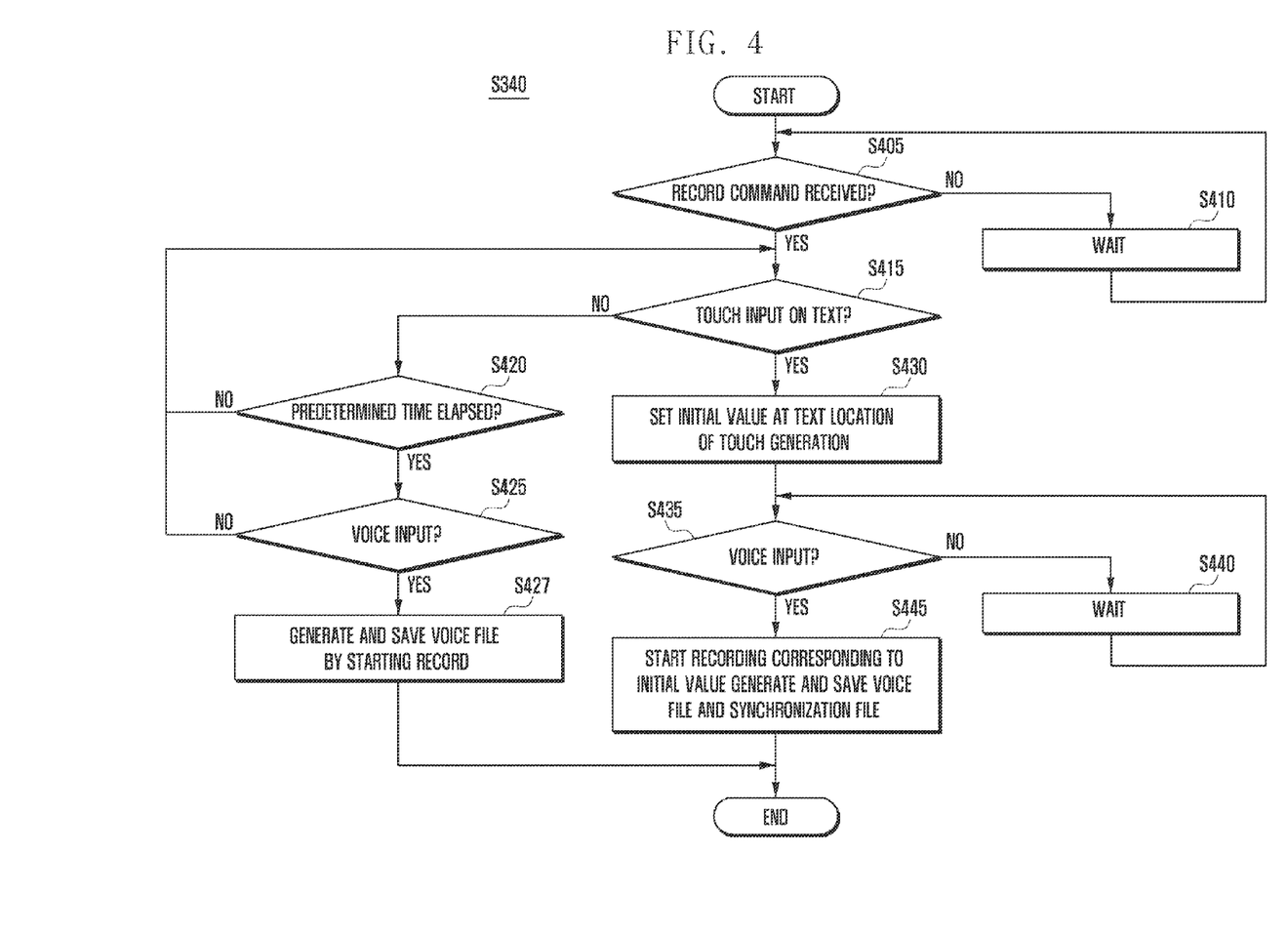
FIG. 4 is a flowchart showing a Text To Speech (TTS) recording procedure of a text included in a specific page of an electronic book to a user voice according to an exemplary embodiment of the present invention.

FIG. 4 is a flowchart showing a TTS recording procedure of a text included in a specific page of an electronic book to a user voice according to an exemplary embodiment of the present invention. FIG. 4 corresponds to step S340 of FIG. 3.

An exemplary method of recording a text included in a specific page of an electronic book may be performed by using a conventional TTS engine. However, a description on this method is excluded in the present invention.

If a user voice record file corresponding to a specific page of the electronic book does not exist, the control unit 260 may display a recording means in a display unit for recording a text included in the page. As an example, the recording means may be a record button REC as shown in FIG. 1.

Referring to FIG. 4, the control unit 260 identifies whether a record command for recording a user voice is input in step S405. If the record command is not input, the control unit 260 waits for an input of the record command input in step S410.

If the record command is input, the control unit 260 must decide a starting time of actual recording and a text location corresponding to the recording. In an exemplary embodiment of the present invention, if a user voice is detected in a state that no touch input is generated for a predetermined time after inputting the record command, the user voice is saved only as a user voice record file.

If a touch is input on a text after inputting the record command, the corresponding text location is set as an initial value of starting to record, and a user voice record file and a synchronization file are saved by synchronizing the detected user voice with the corresponding text location.

This will be described in more detail referring to the flowchart of FIG. 4.

After inputting the record command, the control unit 260 identifies whether a touch is input on the text in step S415. If no touch is input, the control unit 260 identifies whether a predetermined time is elapsed in step S420. If the predetermined time is elapsed, control unit 260 identifies whether a user voice is input in step S425. Namely, the control unit 260 identifies whether a user voice is detected in a state that no touch input is generated for a predetermined time after inputting the record command. If a user voice is input, the control unit 260 generates and saves a user voice record file corresponding to the page by recording in step S427.

If a touch is input on the text in step 415, the control unit 260 sets a text location, in which a touch is generated, as an initial value of starting to record in step S430 and identifies whether a user voice is detected in step S435. If the user voice is not detected, the control unit 260 waits for detecting a user voice in step S440.

If a user voice is detected in step S435, the control unit 260 generates and saves a user voice record file recorded with the user voice and a synchronization file corresponding to the user voice record file in step S445.

Here, the synchronization file includes information for highlighting a text of a user voice being played by synchronizing with the user voice record file. According to an exemplary embodiment of the present invention, the synchronization file may be a Synchronized Multimedia Integration Language (SMIL) file. The SMIL is a W3C standard presentation language for disposing and controlling multimedia data in time and space by using an XML.

The synchronization file according to an exemplary embodiment of the present invention may be configured with a text set corresponding to a time section. For example, in case of TTS recording of a user voice in a specific page of an electronic book, the synchronization file may include information of which a text corresponding to paragraph a of the page is recorded for time section 0~a and another text corresponding to paragraph b of the page is recorded for time section a~b. An exemplary structure of the synchronization file is shown in the following table.

TABLE 1

Structure of synchronization file SMIL_P1 generated in page 1 of electronic book

| Time section | Text location |
|---|---|
| Section a (0~a) | text set_a (1st paragraph of page 1) |
| Section b (a~b) | text set_b (2nd paragraph of page 1) |
| Section c (b~c) | text set_c (3rd paragraph of page 1) |
| — | — |
| — | — |

According to an exemplary embodiment of the present invention, recording can be started by setting a location of a text paragraph at which a touch is input as a starting point when performing TTS recording of a user voice. Alternatively, the recording can be started corresponding to a text paragraph of a drag area in which a user's touch is continuously input. In this case, a location correcting function may be provided so that the control unit 260 displays a drag area parallel to a text line in a display unit even though a user's drag input exceeds the deviation range of the text line. Similarly, according to an exemplary embodiment of the present invention, recording a blank or continued voice can be performed after releasing the user's touch input, and after recording the blank or continued voice, recording the voice can be continued from a location at which a touch is input again.

Figure 5:
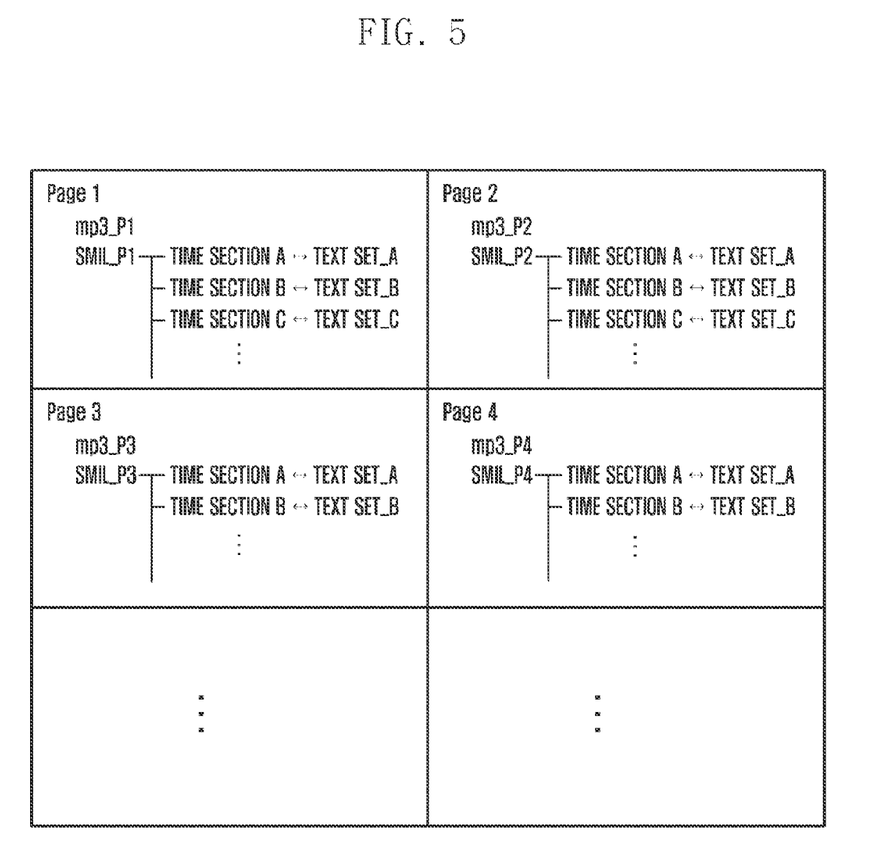
FIG. 5 is a drawing showing a structure of a file stored corresponding to each page of an electronic book in TTS recording of a user voice according to an exemplary embodiment of the present invention.

FIG. 5 is a drawing showing a structure of a file stored corresponding to each page of an electronic book in TTS recording of a user voice according to an exemplary embodiment of the present invention.

Referring to FIG. 5, when performing TTS recording of a user voice corresponding to page 1 of the electronic book, a user voice record file (mp3_P1) recorded with a user voice of the text in page 1 and a synchronization file (SMIL_P1) corresponding to the user voice record file are saved in page 1 of the electronic book by mapping.

In this case, the synchronization file for page 1 of the electronic book is saved by mapping with location information of the text corresponding to each time section of the user voice record file. For example, as shown in FIG. 5, the synchronization file for page 1 of the electronic book is saved by mapping with information of which time section a of the user voice record file is saved with a voice of the text corresponding to paragraph a of page 1 of the electronic book. In the same way, the synchronization file for page 1 of the electronic book is saved by mapping with information of which time section b of the user voice record file is saved with a voice of the text corresponding to paragraph b of page 1 of the electronic book.

Further, if the TTS recording is performed for page 2 of the electronic book, a user voice record file (mp3_P2) recorded with a user voice corresponding to a text of page 2 and a synchronization file (SMIL_P2) corresponding to the user voice record file are saved in page 2 of the electronic book by mapping.

In this case, the synchronization file for page 2 of the electronic book is saved by mapping with location information of the text corresponding to each time section of the user voice record file. For example, as shown in FIG. 5, the synchronization file for page 2 of the electronic book is saved by mapping with information of which time section a of the user voice record file is saved with a voice of the text corresponding to paragraph a of page 2 of the electronic book. In the same way, the synchronization file for page 2 of the electronic book is saved by mapping with information of which time section b of the user voice record file is saved with a voice of the text corresponding to paragraph b of page 2 of the electronic book.

As described above, the user voice record files and the synchronization files saved corresponding to each page of the electronic book are used for highlighting a text corresponding to a user voice being played by synchronizing the user voice with the text. A more detailed description of this feature will be made later.

Figure 6:
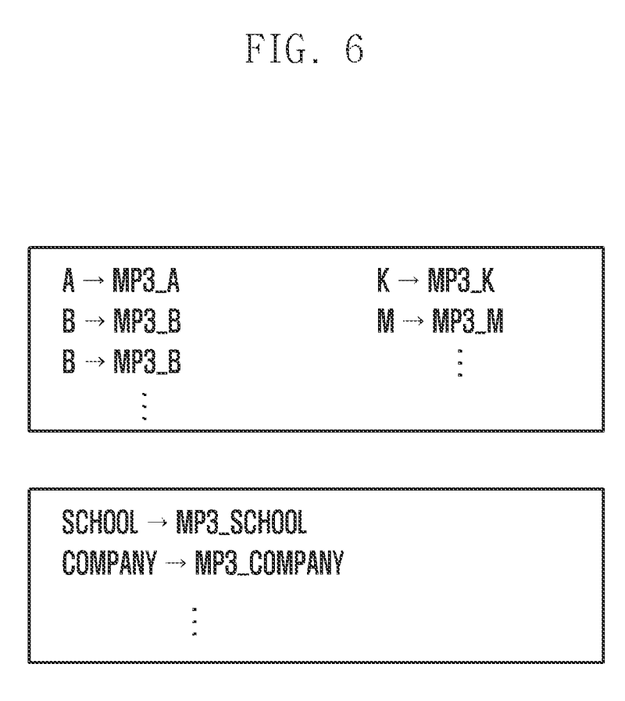
FIG. 6 is a drawing showing a structure of a TTS database storing a user voice by dividing into phonemic voice files in TTS recording of a user voice according to an exemplary embodiment of the present invention.

FIG. 6 is a drawing showing a structure of a TTS database storing a user voice by dividing into phonemic voice files in TTS recording of a user voice according to an exemplary embodiment of the present invention.

Referring to FIG. 6, when TTS recording of a user voice, each user voice may be saved by dividing into phonemic voice files. For example, if the user TTS records a user voice "ABC", the control unit 260 divides the user voice in to "A", "B", and "C" and saves individual phonemic voice files of mp3_A, mp3_B, and mp3_C.

According to another exemplary embodiment of the present invention, a user voice may be saved by dividing into words not by dividing into phonemes. For example, if the user TTS records a user voice "School Company", the control unit 260 divides the user voice into words "School" and "Company" and saves voice files respectively of mp3_School and mp3_Company.

Even though examples of saving a user voice as individual voice files divided by phoneme or word in TTS recording of a user voice are described above, the TTS recording is not limited to the phoneme or word. Namely, even though the user does not record all the content of texts in the electronic book by performing an auto complete function of TTS recording (as will be described later), another exemplary embodiment of saving voice files in a character unit to complete TTS recording for the whole text may be provided.

An exemplary TTS database generated according to the above principle includes a user voice divided by phoneme or word, and is used for the auto complete function of TTS recording. A more detailed description of this feature will be made later.

Figure 7:
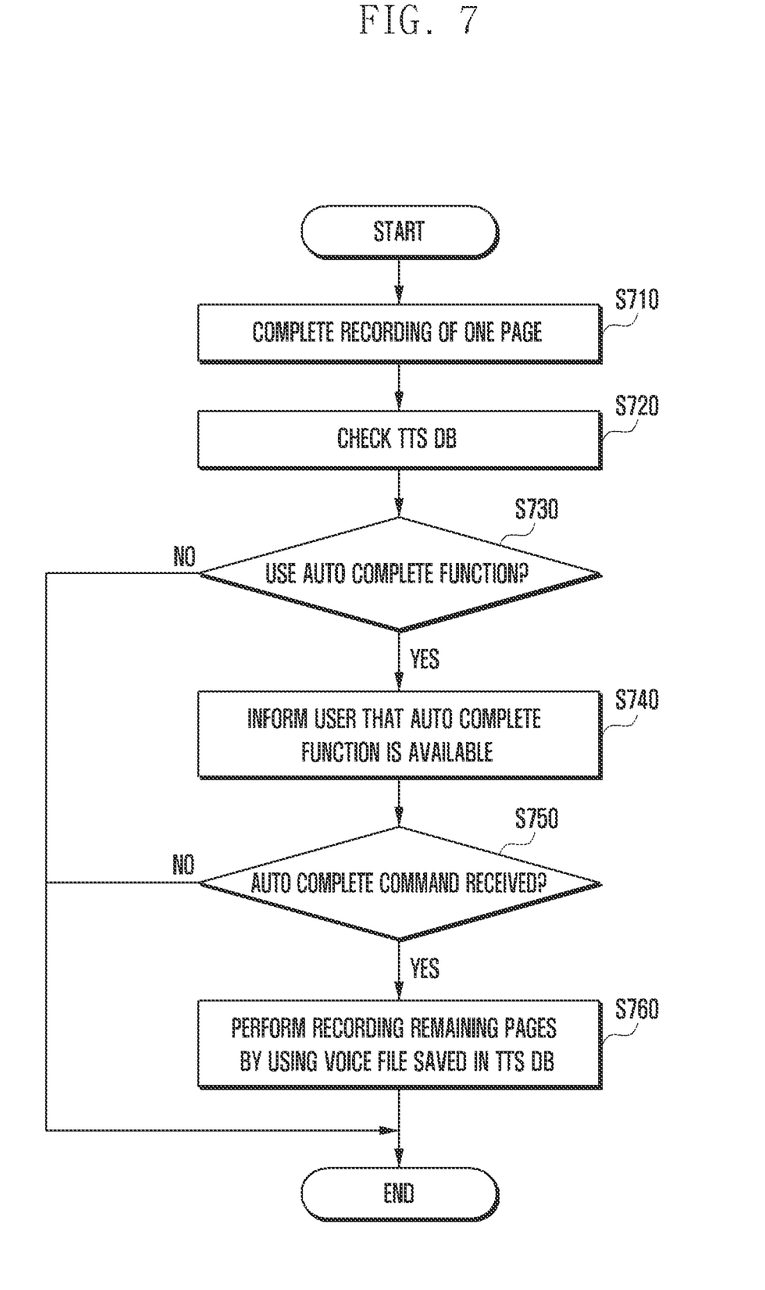
FIG. 7 is a flowchart showing a procedure of performing an auto complete function of TTS recording according to an exemplary embodiment of the present invention.

FIG. 7 is a flowchart showing a procedure of performing an auto complete function of TTS recording according to an exemplary embodiment of the present invention.

According to an exemplary embodiment of the present invention, the control unit 260 saves a user voice in a TTS database by dividing into phonemic voice files classified by phoneme (or word) when TTS recording of a user voice is performed. By using the stored TTS database, a user can perform TTS recording for all the texts of the electronic book without recording the entire content of the text individually.

Hereafter, it is assumed that control unit 260 has obtained information on all the texts included in all the pages of the electronic book.

Referring to FIG. 7, the control unit 260 detects completion of TTS recording of a user voice corresponding to a specific page in step S710. The control unit 260 checks a TTS database in step S720, and identifies whether an auto complete function is available in step S730. For this, the control unit 260 may identify the availability of the auto complete function by comparing each phoneme stored in the TTS database with all the texts included in the all the pages of the electronic book.

According to an exemplary embodiment of the present invention, the control unit 260 identifies the availability of the auto complete function in the following cases:
1) The percentage of registration in the TTS database for all the text included in all the pages of the electronic book is 100%
2) The percentage of registration is higher than a predetermined level In the latter case, the control unit 260 may record by suggesting a required phoneme so that the percentage of registration in the TTS database becomes 100% or by replacing the required phoneme with the most similar phoneme.

If the availability of the auto complete function is identified, the control unit 260 informs the user that the auto complete function is available in step S740. The control unit 260 identifies whether a command for using the auto complete function is received from the user in step S750.

If the command for using the auto complete function is received, or if the auto complete function is not available, the control unit 260 performs TTS recording for the pages which are not TTS recorded by using the phonemic voice file stored in the TTS database in step S760.

Figure 8:
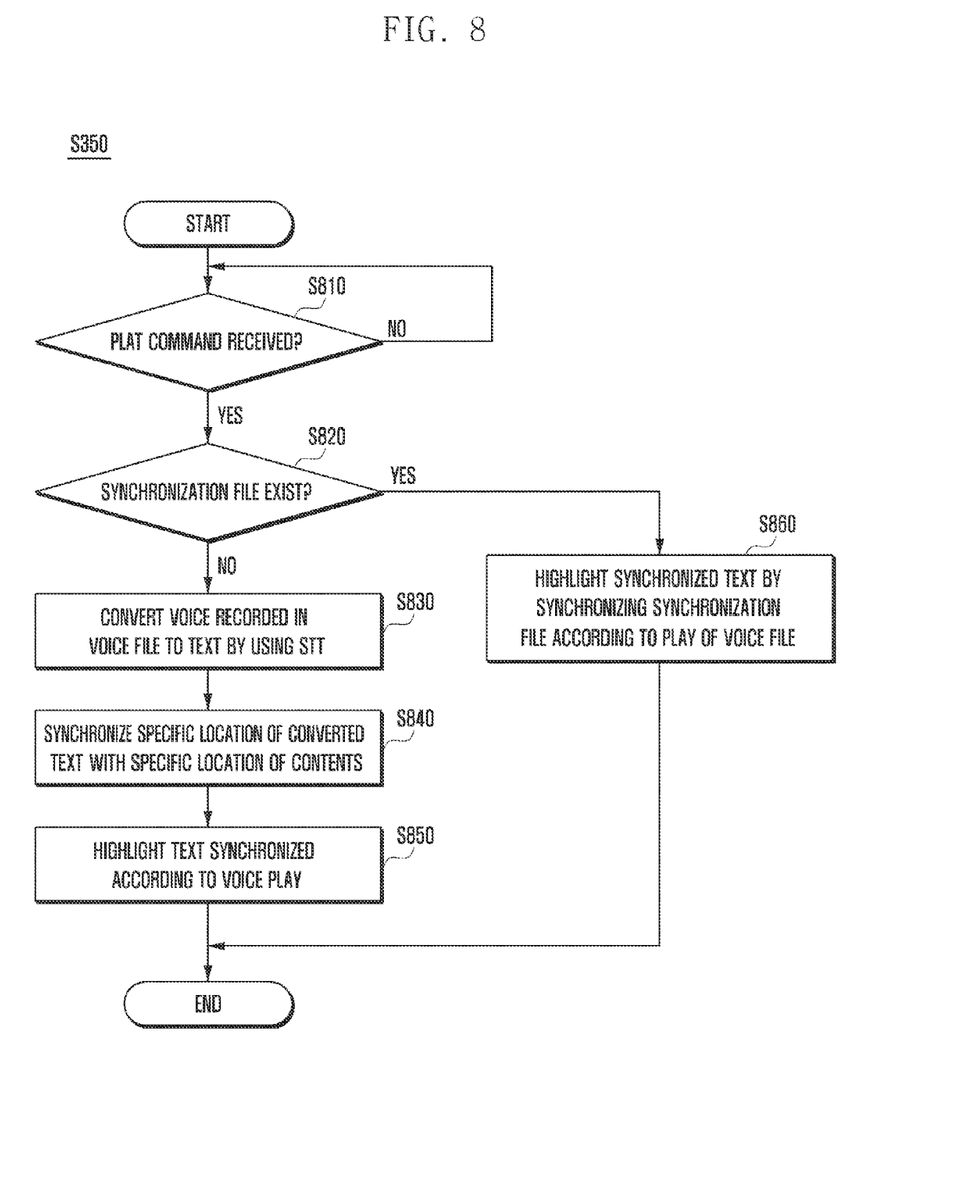
FIG. 8 is a flowchart showing a TTS playing procedure of a specific page of an electronic book according to an exemplary embodiment of the present invention.

FIG. 8 is a flowchart showing a TTS playing procedure of a specific page of an electronic book according to an exemplary embodiment of the present invention. FIG. 8 corresponds to step S350 of FIG. 3.

If a user voice record file corresponding to a specific page of the electronic book exists, the control unit 260 may display a play means for playing the user voice record file in the display unit. The play means may be a play button shown in FIG. 1.

Referring to FIG. 8, the control unit 260 identifies whether a play command for playing the user voice record file is received in step S810. If the play command is received, the control unit 260 identifies whether a synchronization file corresponding to the user voice record file exists in step S820.

If a synchronization file exists, the control unit 260 plays by synchronizing the user voice record file with the synchronization file in step S860. The playing by synchronizing the user voice record file with the synchronization file means highlighting a text corresponding to a user voice being played.

As shown in FIG. 5, a user voice record file and a synchronization file corresponding to the user voice record file are saved in each page of the electronic book by mapping, and a text set location corresponding to each time section of the user voice record file is included in the synchronization file by mapping. Accordingly, the control unit 260 can identify a text location corresponding to a user voice being played by using the above relationship, and can highlight the corresponding location.

If no synchronization file exists in step S820, the control unit 260 converts a voice recorded in the user voice record file to a text by using a Speech To Text (STT) function in step S830. The control unit 260 identifies a location of the converted text, preferably, a text location in the electronic book corresponding to the first location of the converted text and, in step S840, synchronizes the first location of the converted text with the text location in the electronic book.

The control unit 260 highlights a text corresponding to the user voice according to the play of the user voice in step S850.

Figure 9:
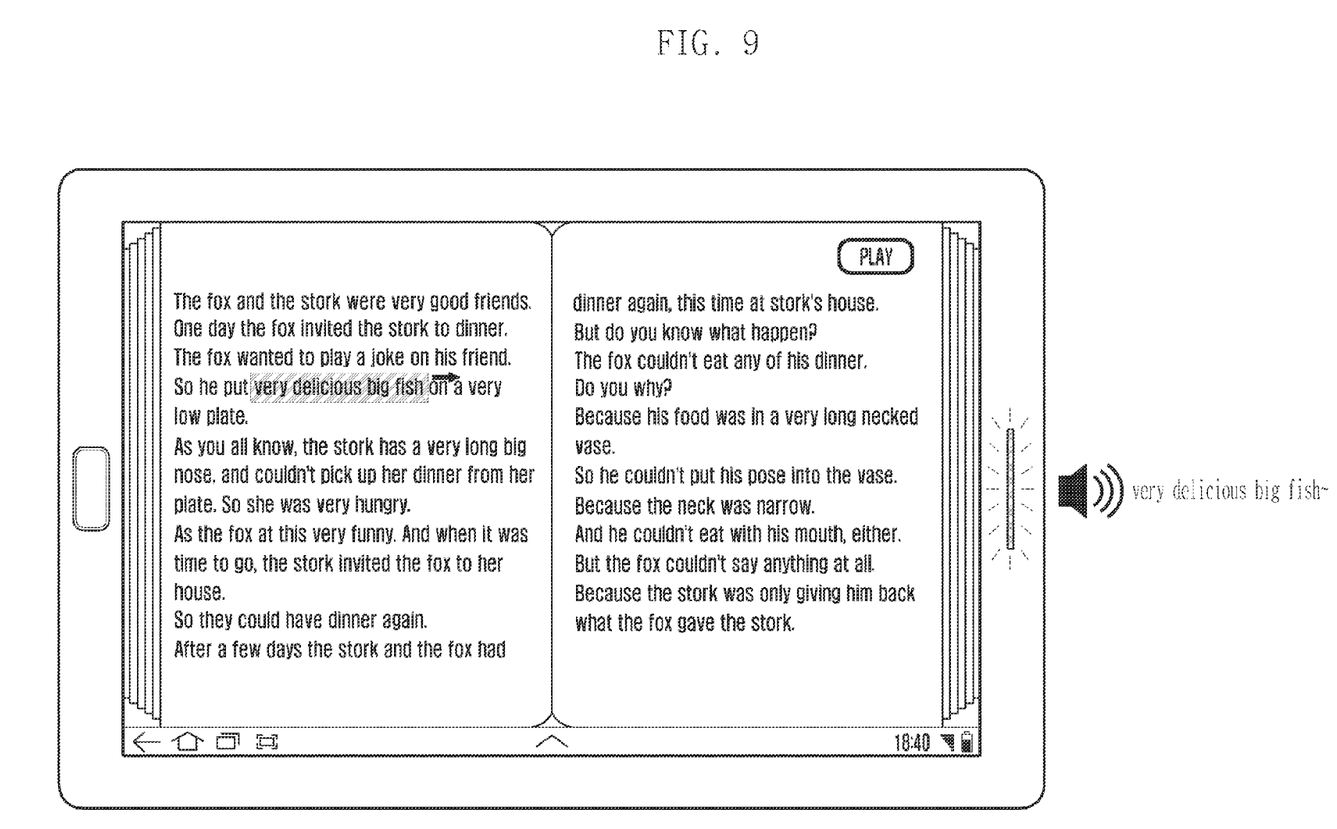
FIG. 9 is a drawing showing an example of display by synchronizing a user voice with a text in TTS playing of an electronic book according to an exemplary embodiment of the present invention.

FIG. 9 is a drawing showing an example of display by synchronizing a user voice with a text in TTS playing of an electronic book according to an exemplary embodiment of the present invention.

Referring to FIG. 9, at least one of a user voice record file corresponding to a text in a page and a synchronization file corresponding to the user voice record file is saved in each page of the electronic book according to an exemplary embodiment of the present invention.

When entering a specific page, if a user voice record file exists in the corresponding page, the electronic book displays a play means. Subsequently, if a play command is input by the user, the electronic book highlights a text corresponding to a user voice being played.

According to the present invention, a user voice can be recorded corresponding to a text of a specific page when recording the specific page of an electronic book, and the text can be highlighted corresponding to the user voice being played by synchronizing the user voice with the text while playing the user voice. Accordingly, a user can experience reading a real book through an intuitive interface.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for recording and playing a user voice in a mobile terminal, the method comprising:
    entering a page by executing an electronic book;
    identifying, by the mobile terminal, whether a first user voice record file related to the page exists;
    generating the first user voice record file related to the page by recording a text included in the page to a user voice if the first user voice record file does not exist;
    playing the user voice by synchronizing the user voice stored in the first user voice record file with the text if the first user voice record file exists;
    generating a phonemic voice file by classifying the user voice stored in the first user voice record file by phoneme;
    comparing the phonemic voice file with all the text included in the electronic book; and
    generating a second user voice record file related to remaining pages without a stored user voice record file if a percentage of the phonemic voice file for all the text is higher than a predetermined level,
    wherein if a required phoneme is not stored in a Text To Speech (TTS) database, then informing a user by a suggestion to record phoneme.

2. The method of claim 1, wherein the generating of the first user voice record file comprises recording a text included in the page to a user voice and a synchronization file including text location information corresponding to each time section of the first user voice record file.

3. The method of claim 1, wherein the generating of the first user voice record file further comprises:
    identifying whether a touch input corresponding to a text location is detected if a record command for the text is received; and
    starting to record a user voice if the touch input is not detected within a predetermined time elapse.

4. The method of claim 3, further comprising setting the text location detected by the touch input as an initial location starting to record a user voice if the touch input corresponding to the text location is detected.

5. The method of claim 1, further comprising:
    informing a user that the auto complete of recording is possible, if the percentage of the phonemic voice file for all the text is higher than the predetermined level.

6. The method of claim 1, wherein the playing of the user voice comprises highlighting a text corresponding to the user voice stored in the first user voice record file.

7. The method of claim 1, wherein the playing of the user voice further comprises:
    identifying whether a synchronization file related to the first user voice record file exists if a play command is received;
    identifying text location information corresponding to each time section of the first user voice record file included in the synchronization file if the synchronization file exists; and
    playing the user voice by synchronizing the user voice recorded in the first user voice record file with the text according to the result of the identification.

8. The method of claim 7, further comprising:
    converting a user voice recorded in the first user voice record file related to the page to the text if the synchronization file does not exist; and
    playing the user voice by synchronizing the converted text with the text included in the page.

9. An apparatus for recording and playing a user voice in a mobile terminal, the apparatus comprising:
    an input device configured to receive a user input;
    a display configured to display a text included in an electronic book; and
    at least one processor configured to:
        identify whether a first user voice record file related to the page exists when entering a page of the electronic book,
        generate the first user voice record file by recording a text included in the page to a user voice if the user voice record file does not exist,
        play the user voice by synchronizing the user voice stored in the first user voice record file with the text if the first user voice record file exists,
        generate a phonemic voice file by classifying the user voice by phoneme,
        compare the phonemic voice file with all the text included in the electronic book, and
        generate a second user voice record file related to remaining pages without a stored user voice record file if a percentage of the phonemic voice file for all the text is higher than a predetermined level,
    wherein if a required phoneme is not stored in a Text To Speech (TTS) database, then informing a user by a suggestion to record phoneme.

10. The apparatus of claim 9, wherein the at least one processor is further configured to generate the first user voice record file by recording a text included in the page to a user voice and a synchronization file including text location information corresponding to each time section of the first user voice record file.

11. The apparatus of claim 9, wherein the at least one processor is further configured to:
identify whether a touch input corresponding to a text location is detected if a record command for the text is received, and
start recording a user voice if the touch input is not detected within a predetermined time elapse.

12. The apparatus of claim 11, wherein the at least one processor is further configured to set the text location detected by the touch input as an initial location starting to record a user voice if the touch input corresponding to the text location is detected.

13. The apparatus of claim 9, wherein the at least one processor is further configured to:
inform a user that the auto complete of recording is possible, if the percentage of the phonemic voice file for all the text is higher than the predetermined level.

14. The apparatus of claim 9, wherein the at least one processor is further configured to highlight a text corresponding to the user voice stored in the first user voice record file.

15. The apparatus of claim 9, wherein the at least one processor is further configured to:
identify whether a synchronization file related to the first user voice record file exists if a play command is received,
identify text location information corresponding to each time section of the first user voice record file included in the synchronization file if the synchronization file exists, and
play the user voice by synchronizing the user voice recorded in the first user voice record file with the text according to the result of the identification.

16. The apparatus of claim 15, wherein the at least one processor is further configured to:
convert a user voice recorded in the first user voice record file related to the page to the text if the synchronization file does not exist, and
play, by synchronizing the converted text with the text included in the page.

17. A non-transitory computer-readable storage medium storing instructions that, when executed, cause at least one processor to perform a method comprising:
entering a page by executing an electronic book;
identifying whether a first user voice record file related to the page exists;
generating the first user voice record file related to the page by recording a text included in the page to a user voice if the first user voice record file does not exist;
playing the user voice by synchronizing the user voice stored in the first user voice record file with the text if the first user voice record file exists;
generating a phonemic voice file by classifying the user voice by phoneme;
comparing the phonemic voice file with all the text included in the electronic book; and
generating a second user voice record file related to remaining pages without a stored user voice record file if a percentage of the phonemic voice file for all the text is higher than a predetermined level,
wherein if a required phoneme is not stored in a Text To Speech (TTS) database, then informing a user by a suggestion to record phoneme.

* * * * *